US008635237B2

(12) United States Patent
Bansal et al.

(10) Patent No.: US 8,635,237 B2
(45) Date of Patent: Jan. 21, 2014

(54) CUSTOMER FEEDBACK MEASUREMENT IN PUBLIC PLACES UTILIZING SPEECH RECOGNITION TECHNOLOGY

(75) Inventors: Ravi P. Bansal, Tampa, FL (US); Mike V. Macias, Austin, TX (US); Saidas T. Kottawar, Pune (IN); Salil P. Gandhi, Yerwada (IN); Sandip D. Mahajan, Yerwada (IN)

(73) Assignee: Nuance Communications, Inc., Burlington, MA (US)

( * ) Notice: Subject to any disclaimer, the term of this patent is extended or adjusted under 35 U.S.C. 154(b) by 656 days.

(21) Appl. No.: 12/496,851

(22) Filed: Jul. 2, 2009

(65) Prior Publication Data

US 2011/0004624 A1 Jan. 6, 2011

(51) Int. Cl.
*G06F 7/00* (2006.01)
(52) U.S. Cl.
USPC ........... 707/758; 707/776; 707/802; 704/231; 704/251
(58) Field of Classification Search
USPC ........... 707/999.006, 758, 776, 802; 704/231, 704/251
See application file for complete search history.

(56) References Cited

U.S. PATENT DOCUMENTS

| | | | |
|---|---|---|---|
| 6,510,427 B1 | 1/2003 | Bossemeyer, Jr. et al. | |
| 7,058,625 B2 | 6/2006 | Bossemeyer, Jr. et al. | |
| 7,191,133 B1 | 3/2007 | Pettay | |
| 2003/0041056 A1 | 2/2003 | Bossemeyer, Jr. et al. | |
| 2004/0230438 A1 | 11/2004 | Pasquale et al. | |
| 2005/0021470 A1* | 1/2005 | Martin et al. | 705/51 |
| 2005/0289582 A1* | 12/2005 | Tavares et al. | 725/10 |
| 2007/0150916 A1* | 6/2007 | Begole et al. | 725/10 |
| 2008/0120099 A1* | 5/2008 | Relyea et al. | 704/227 |
| 2008/0243499 A1* | 10/2008 | Poi | 704/231 |
| 2008/0262995 A1* | 10/2008 | Zweig et al. | 707/1 |

OTHER PUBLICATIONS

Dey et al., Opinion Mining From Noisy Text Data, AND '08, Jul. 24, 2008, p. 83, Singapore.
Klein et al., Using Opinion Polls to Help Measure Business Impact in Agile Developement, BIPI '08, May 13, 2008, p. 25, Leipzig, Germany.

* cited by examiner

*Primary Examiner* — Hosain Alam
*Assistant Examiner* — Jieying Tang

(57) ABSTRACT

A method, a system and a computer program product for enabling a customer response speech recognition unit to dynamically receive customer feedback. The customer response speech recognition unit is positioned at a customer location. The speech recognition unit is automatically initialized when one or more spoken words are detected. The response statements of customers are dynamically received by the customer response speech recognition unit at the customer location, in real time. The customer response speech recognition unit determines when the one or more spoken words of the customer response statement are associated with a score in a database. An analysis of the words is performed to generate a score that reflects the evaluation of the subject by the customer. The score is dynamically updated as new evaluations are received, and the score is displayed within graphical user interface (GUI) to be viewed by one or more potential customers.

21 Claims, 8 Drawing Sheets

| Phrase | Actions | Score |
|---|---|---|
| "I cant miss this one" | Increment positive feedback by 1 | 6 |
| "I love this show" | Increment positive feedback by 2 | 8 |
| "This movie is so boring" | Increment negative feedback by 1 | 2 |

CUSTOMER FEEDBACK MEASUREMENT IN PUBLIC PLACES UTILIZING SPEECH RECOGNITION TECHNOLOGY

BACKGROUND

1. Technical Field

The present invention generally relates to computer systems and in particular to voice recognition technology within computer systems.

2. Description of the Related Art

Feedback information concerning audience dynamics, reactions, and concerns is an important aspect of the restaurant and entertainment industry. Restaurants, televisions shows, shopping entities, and entertainment entities (e.g. movie theatres, sports arenas, and amusement parks) often depend on customer feedback to provide quality products and services. Information regarding the quality of food, pricing, customer volume, and service experience in a restaurant helps the owner to identify customer requirements and maintain quality service. Viewer/listener feedback in relation to television/radio broadcast helps determine how many people are watching and/or listening to a particular television or radio program. Understanding customer dynamics assists business owners gauge the "popularity" of a particular business.

Feedback regarding entities such as restaurants, movies, broadcast programs (e.g. television shows, radio shows, cable provided programs etc.), video games, shopping centers, travel experiences (e.g. airlines, resorts, and amusement parks) are sparingly input and reviewed on websites. Customer responses to services and audience dynamics (audience/customer population) provided by an entity often determine the success of an entity and provide information to decision makers (e.g. consumers, owners, managers, and marketing departments) regarding continued support for the entity. There is no available method to easily capture customer comments made while watching a movie, watching television, and/or while utilizing a business. Motivated customers may utilize websites to voice their opinion of a movie, television show, restaurant, and/or shopping experience. However, valuable information is lost after completion of the experience. A vast majority of consumers never have their opinion heard because they choose not to utilize resources such as internet websites and customer response surveys.

SUMMARY OF ILLUSTRATIVE EMBODIMENTS

Disclosed are a method, a system and a computer program product for enabling a customer response speech recognition unit to dynamically receive customer feedback. The customer response speech recognition unit is positioned at a customer location. The speech recognition unit is automatically initialized when one or more spoken words are detected. The response statements of customers are dynamically received by the customer response speech recognition unit at the customer location, in real time. The customer response speech recognition unit determines when the one or more spoken words of the customer response statement are associated with a score in a database. An analysis of the words is performed to generate a score that reflects the evaluation of the subject by the customer. The score is dynamically updated as new evaluations are received, and the score is displayed within a graphical user interface (GUI) to be viewed by one or more potential customers.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein:

FIG. 3 illustrates an example audience response graphical user interface displaying an analysis and a score associated with a customer response statement, according to one embodiment of the invention;

DETAILED DESCRIPTION OF AN ILLUSTRATIVE EMBODIMENT

Figure 1:
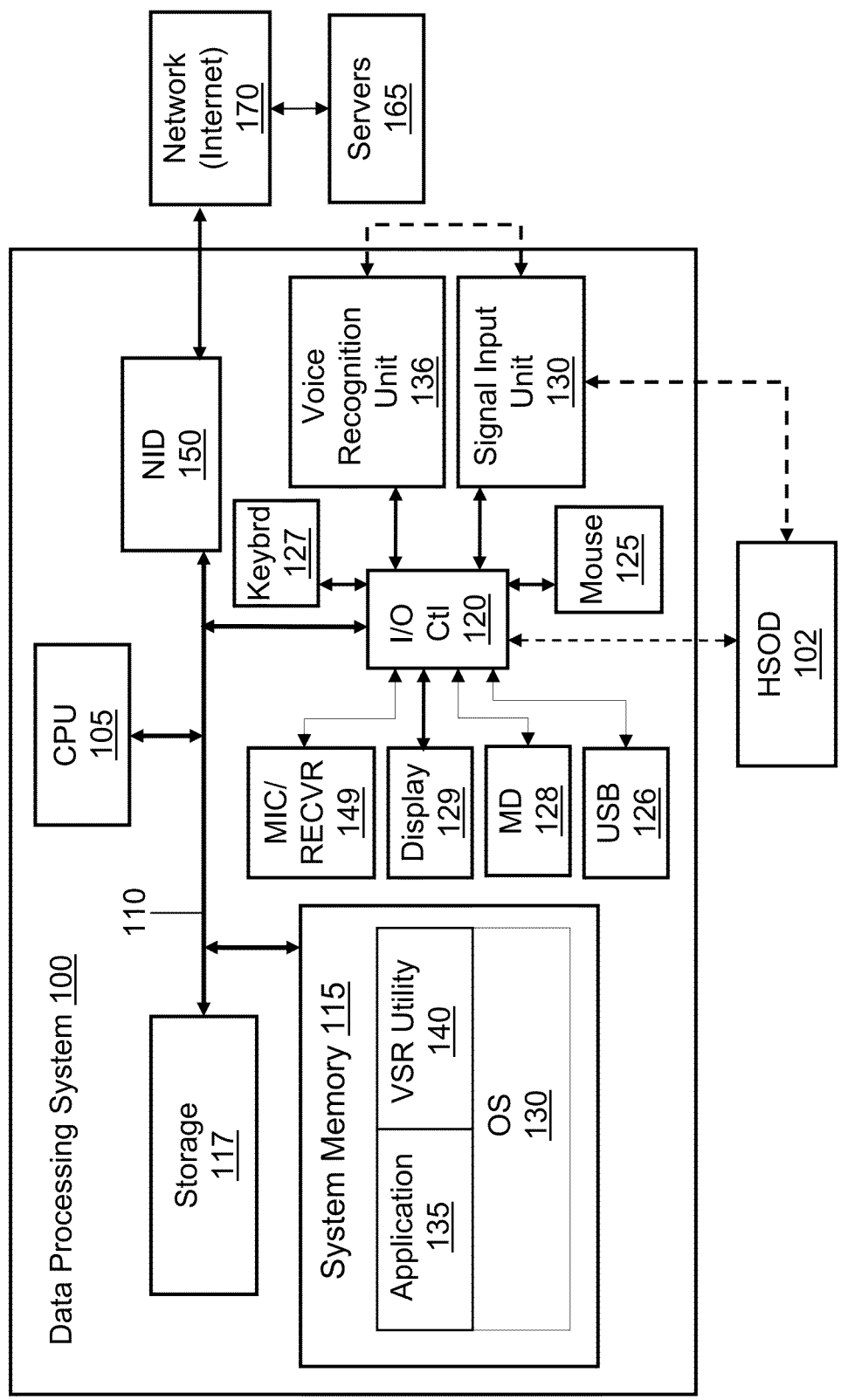
FIG. 1 a block diagram of a data processing system, within which various features of the invention may advantageously be implemented, according to one embodiment of the invention.

The illustrative embodiments provide a method, a system and a computer program product for enabling a customer response speech recognition unit to dynamically receive customer feedback. The customer response speech recognition unit is positioned at a customer location. The speech recognition unit is automatically initialized when one or more spoken words are detected. The response statements of customers are dynamically received by the customer response speech recognition unit at the customer location, in real time. The customer response speech recognition unit determines when the one or more spoken words of the customer response statement are associated with a score in a database. An analysis of the words is performed to generate a score that reflects the evaluation of the subject by the customer. The score is dynamically updated as new evaluations are received, and the score is displayed within a graphical user interface (GUI) to be viewed by one or more potential customers.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the term "sensory receiving environment" includes, but is not limited to, an environment whereby one or more of the following programs/subjects/events are presented: a broadcast of a program, a live performance, exhibition of a video, video game play, a movie (program) is presented, and/or output of audio (e.g. pre-recorded audio, live audio program). The sensory receiving environment may also include, but is not limited to: video game environments, shopping centers, travel experiences (e.g. airlines, resorts, and amusement parks). Within the sensory receiving environment, an audience member can hear, see, smell, touch, and/or taste, wherein an audio response to the sensation is detected by a utility. Additionally, the terms "audio" and "audible" are utilized interchangeably, herein.

With reference now to the figures, FIG. 1 depicts a block diagram representation of an example data processing system. DPS 100 comprises at least one processor or central processing unit (CPU), of which CPU 105 is illustrated. CPU 105 is connected to system memory 115 via system interconnect/bus 110. Also connected to system bus 110 is I/O controller 120, which provides connectivity and control for input devices, of which pointing device (or mouse) 125, keyboard 127, and receiver (microphone) 149 are illustrated, and output devices, of which display 129 is illustrated. Additionally, removable storage drives, e.g., multimedia drive (MD) 128 (e.g., CDRW or DVD drive) and USB (universal serial bus) port 126, are also coupled to I/O controller 120. Removable storage drives, such as multimedia drive 128 and USB port 126, allows removable storage devices (e.g., writeable CD/DVD or USB memory drive, commonly called a thumb drive) to be inserted therein and be utilized as both input and output (storage) mechanisms. Voice recognition unit 136 and signal input unit 130 are illustrated as connected to I/O controller 120. Signal input unit 130 receives antenna, cable, digital, and/or satellite transmission signals. Signal input unit 130, human sensory output device (HSOD) 102 (such as a television or radio, for example) and voice recognition unit 136 communicate via a wired and/or wireless connection. HSOD 102 includes, but is not limited to a television, stereo (music output device), video display, or any device that outputs information and/or entertainment pertaining to human sensory. Additionally, DPS 100 also comprises storage 117, within which data/instructions/code such as a database of keywords and scores may be stored.

DPS 100 is also illustrated with a network interface device (NID) 150, by which DPS 100 may connect to one or more access/external networks 150, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 150 may be configured to operate via wired and/or wireless connection to an access point of the network. Network 170 may be an external network such as the Internet or wide area network (WAN), or an internal network such as an Ethernet (local area network—LAN) or a Virtual Private Network (VPN). Connection to the external network 170 may be established with one or more servers 165, which may also provide data/instructions/code for execution on DPS 100, in one embodiment.

In addition to the above described hardware components of DPS 100, various features of the invention are supported via software (or firmware) code or logic stored within system memory 115 or other storage (e.g., storage 117) and executed by CPU 105. Thus, for example, illustrated within system memory 115 is application 135 and voice and sound recognition (VSR) utility 140 (which executes on CPU 105 to provide VSR logic). Application 135 and/or VSR utility 140 include a voice recognition application (e.g. IBM (International Business Machines) ViaVoice®, Dragon Naturally Speaking®, a product of Nuance Communications, Inc., Microsoft Windows® Speech Recognition, a product of Microsoft Corp). In actual implementation, VSR utility 140 may be combined with or incorporated within application 135 to provide a single executable component, collectively providing the various functions of each individual software component when the corresponding combined code is executed by CPU 105. For simplicity, VSR utility 140 is illustrated and described as a stand alone or separate software/firmware component, which provides specific functions, as described below.

In one embodiment, servers 165 include a software deploying server, and DPS 100 communicates with the software deploying server (165) via network (e.g., Internet 170) using network interface device 150. Then, VSR utility 140 may be deployed on the network, via software deploying server 165. With this configuration, software deploying server performs all of the functions associated with the execution of VSR utility 140. Accordingly, DPS 100 is not required to utilize internal computing resources of DPS 100 to execute VSR utility 140.

In another embodiment, signal input unit 130 receives one or more of an antenna, cable, digital, and/or satellite transmission signals and transmits one or more of the signals to HSOD 102. Voice recognition unit (also described as a voice capture and recognition unit) 136 monitors the current broadcast program displayed on HSOD 102 via wired and/or wireless connection between voice recognition unit 125, signal input unit 130, and HSOD 102. When or more human voices are received, voice recognition unit 136 and VSR utility 140 associate the number of unique human voices with the current broadcast program.

CPU 110 executes VSR utility 140 as well as OS 130, which supports the user interface features of VSR utility 140. In the described embodiment, VSR utility 140 generates/provides several graphical user interfaces (GUI) to enable user interaction with, or manipulation of, the functional features of VSR utility 140. Certain functions supported and/or implemented by VSR utility 140 generate processing logic executed by processor and/or device hardware to complete the implementation of that function. For simplicity of the description, the collective body of code that enables these various features is referred to herein as VSR utility 140. Among the software code/instructions/logic provided by VSR utility 140, and which are specific to the invention, are: (a) code/logic for receiving audio input within sensory receiving environment; (b) code/logic for identifying each unique human voice among the one or more human voices received within the audio input; (c) code/logic for determining a count of unique human voices detected in the sensory receiving environment; (d) code/logic for outputting the count of the one or more unique human voices as a count of audience members; (e) code/logic for identifying one or more keywords within the audio input that includes speech and speech related sounds; (c) code/logic for comparing the one or more received keywords to one or more pre-identified words in a database; and (d) code/logic for generating a score for the one or more received keywords, wherein the score is one of a positive, a negative, and a neutral evaluation of the one or more received keywords. According to the illustrative embodiment, when CPU 105 executes VSR utility 140, components of DPS 100 initiate a series of functional processes that enable the above functional features as well as additional functionalities. These functionalities are described in greater detail below within the description of FIGS. 2-8.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
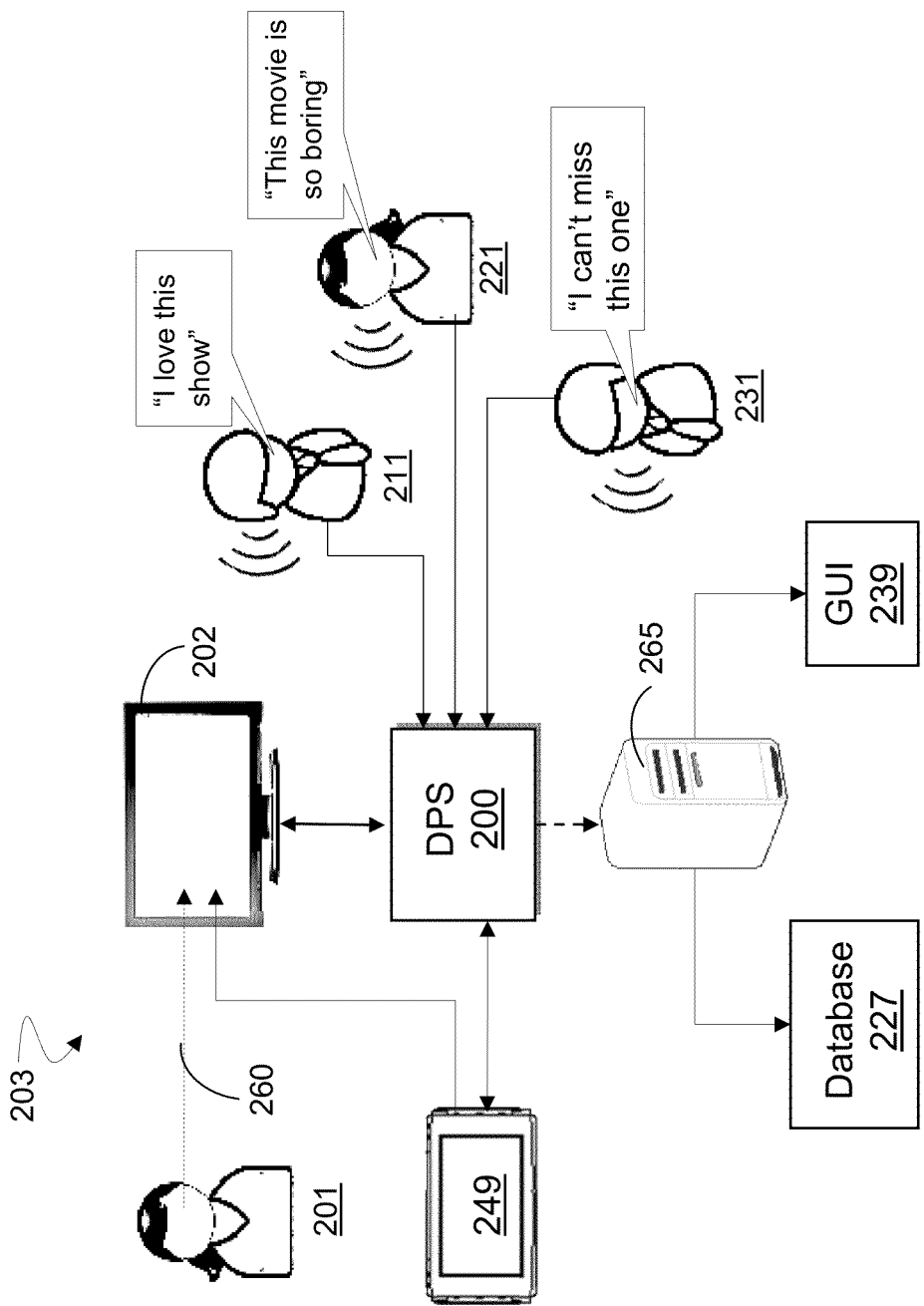
FIG. 2 is a diagram of a network of devices communicating with a voice recognition unit for detecting one or more voices in an audience, in accordance with one embodiment of the invention.

With reference now to FIG. 2, there is depicted a network of devices communicating with a voice recognition unit for detecting one or more voices in an audience, within a sensory receiving environment. Sensory receiving environment 203 includes DPS 200, television unit 202, and server 265. Database 227 is stored at server 265, and server 265 distributes and manages audience analysis graphical user interface (GUI) 239. Audience member 1 201, audience member 2 211, audience member 3 221, and audience member 4 231 are detected by DPS 200. View 260 identifies audience member 1 201 is viewing television unit 202 without any audio expression. Within sensory receiving environment 203, one or more voice recognition unit(s) 249 is positioned at a location, which may be a public, private, and/or consumer sensory receiving environment (203). Voice recognition unit 249 has a wired and/or wireless connection to DPS 200. Internet (e.g. network 170 of FIG. 1) is utilized to connect voice recognition unit 249 locally to DPS 200 and/or to remote server 265. Database 227 and GUI 239 are provided and/or stored by server 265 and/or DPS 200.

In one embodiment, one or more spectrograms are created when one or more voices are received by voice recognition unit 249. When the one or more voices are received, the voices are digitally sampled to create one or more spectrograms for each statement received. The spectrograms are created utilizing short-time Fourier transform. The digitally sampled data is partitioned, and each partition is Fourier transformed to calculate the magnitude of the frequency spectrum. The spectra from each partition, for a given statement, are conjoined to create the spectrogram.

In another embodiment, each time a new aural output is received by voice recognition unit 249 a new spectrogram is dynamically generated. The spectrogram depicts the received sound in terms of time, frequency, and amplitude. The resulting spectrogram is a depiction of consonants, vowels and semi-vowels in isolation or in combination (co-articulation) as created by one or more members in the audience, for example audience member 1 201, audience member 2 211, audience member 3 221, and audience member 4 231.

In one embodiment, a new spectrogram is compared to a first spectrogram to determine when a new audience member is within sensory receiving environment 203. The count of unique voices (thereby audience members) is incremented by one when an analysis of the spectrogram determines the spectrogram is from a new audience member (or unique voice). A first spectrogram generated during a first program is compared by voice and sound recognition (VSR) utility (140 of FIG. 1) to a second spectrogram generated during the first program. The patterns and peaks depicted by the spectrograms provide information for the distinctive aural characteristics of each statement. If one or more patterns and peaks of the first spectrogram and the second spectrogram are identical (within a predetermined margin of error), the second spectrogram is not identified as a spectrogram from an unique voice (or audience member). Thereby the count of audience members is not incremented by one. If all patterns and peaks of the first spectrogram and the second spectrogram are unique (within a predetermined margin of error), the count of unique voices is incremented by one.

In one embodiment, voice recognition unit 249 includes an acoustic processing section for converting an analog voice signal into a digital voice signal. Voice recognition system recognizes a voice signal as a word string. The VSR utility performs one or more arithmetical operations on the received voice signal. An acoustic model (along with one or more pre-identified keywords stored in database 227) is retrieved to determine the intent of the words provided in the voice signal.

In one embodiment, database 227 stores the keyword information such as acoustic models including, but not limited to, structures of a sentence, and a probability of appearance of words. A decoding application is included within the VSR utility for recognizing the digital voice signal as a word string. The audio response is decoded utilizing previously stored acoustic model and keyword information.

In another embodiment, VSR utility 140 (of FIG. 1) dynamically analyzes a digital speech signal when voice recognition unit 249 receives one or more words from an audio response. The audio response is transformed into the frequency domain utilizing a windowed fast Fourier transform. The fast Fourier transform analyzes at least every $\frac{1}{100}$ of a second, and each $\frac{1}{100}$ of a second result in a graph of the amplitudes of frequency components. The graph of the frequency components describe the sound received within that $\frac{1}{100}$ of a second. Voice recognition unit 249 utilizes database 227 which includes one or more previously entered graphs of frequency components, such as a codebook. The previously entered graphs of frequency components associate one or more sounds, made by a human voice, with one or more predetermined words. The audio sounds received by voice recognition unit 249 are identified as one or more pre-identified keywords by matching the Fourier transformed audio response to one or more entries within the codebook. When a word within database 227 is a match, one more rules are imposed by one or more of an acoustic, lexical, and language model to determine the intent of the audio response.

In one embodiment, voice recognition unit 249 includes one more speaking modes for recognition of the audio response. A first speaking mode is an isolated word mode, whereby one or more predetermined words and phrases are received and/or extracted by voice recognition unit 249 when the audio response is received. A second speaking mode is a continuous speaking mode, whereby voice recognition unit 249 receives the audio response and analyzes the one or more words respectively (i.e. in order, as received by voice recognition unit 249). The independent and continuous speaking modes are speaker independent. In another embodiment, voice recognition unit 249 is associated with the signal displayed on television unit 202. Voice recognition unit 249 automatically cancels the sound output by the signal associated with sensory receiving environment 203. For example, when a character in a movie states "I have had the best time tonight" the statement is received as a separate statement at the voice recognition unit. The separate signal is inverted when received voice recognition unit 249. When the broadcast/program signal is received at voice recognition unit 249 VRU utility adds a 'negative' (or inverted) signal of the received broadcast/program signal (separate), thereby creating a null signal. The inverted separate input is added to the received input from the audio detection unit to generate a filtered output with the captured audio response from audience member 1 201, audience member 2 211, audience member 3 221, and/or audience member 4 231. Voice recognition unit 249 does not receive the statement "I have had the best time tonight" as an audio response from the audience; instead voice recognition unit 249 receives a filtered output. Whereby the filtered output, or audio response received in sensory receiving environment 203 is an expression of individuals within the audience (audience member 1 201, audience member 2 211, audience member 3 221, and/or audience member 4 231). The filtered output is received by voice recognition unit 249, and processed as an audio input that includes speech and speech related sounds.

In another embodiment, one or more words spoken in sensory receiving environment 203 are compared to the subject matter associated with sensory receiving environment 203 (e.g. food, shopping, program, sporting event). The subject matter associated with sensory receiving environment 203 is compared to the audio response received. One or more subjects are linked to pre-identified keywords database 227. Calculating a score of the subject matter includes utilizing a predetermined analysis formula. The predetermined analysis formula calculates when a statement is not applicable to a subject matter, when a negative score should be applied for a statement, and when a positive score should be applied for a statement. When the audio response received within sensory receiving environment 203 does not match pre-identified keywords associated with the response, the audio response may not be applicable to the subject matter. When the audio response is not applicable to the subject matter, the inapplicable audio information is dismissed as a candidate for scoring the subject matter, or the audio information is rated neutrally. For example, when the statement "now I am hungry" is made during a food commercial, the predetermined analysis formula assigns a high score to the commercial (for the associated statement) because the content of the commercial is effective in inducing a food craving (hungry) for at least one person in the viewing environment. However, when the statement "now I am hungry" is made at a pet store, the predetermined analysis formula assigns a neutral score to the pet store for the statement because the statement is not associated with the efficacy of the pet store. The sensitivity of voice recognition unit 249 to determine when to score and dismiss statements is modified according to the viewing environment. For example, the sensitivity of a voice recognition unit to dismiss statements at a fast food restaurant is higher than at a five star restaurant because conversation at a fast food restaurant is more diverse (i.e. inclusive of a variety of subjects).

In one embodiment, voice recognition unit 249 is a speaker independent and a continuous speech recognition unit. Therefore voice recognition unit 249 is not tuned to one particular voice and does not require a pause between words to analyze the audio response. Voice recognition unit 249 analyzes spontaneous speech including laughter, involuntary repeat of words, long and short pauses, etc. VSR utility (140 of FIG. 1) analyzes stress, inflection (i.e. tone), and rhythm of the received word(s) to determine intent (e.g. sarcasm, delight, anger, frustration) of the received audio response.

In another embodiment, multiple microphones and/or a microphone array are associated with DPS 200 and/or voice recognition unit 249. Increasing the number of microphones lowers the signal to noise ratio, thereby improving voice recognition accuracy. Within sensory receiving environment 203 multiple microphones and/or microphone arrays produce directionally sensitive gain patterns that are adjusted to increase sensitivity to audience member(s) of sensory receiving environment 203. Increasing the sensitivity of voice recognition for the audience members reduces the error rates associated with voice recognition analysis in sensory receiving environment 203.

In one embodiment, a voice recognition unit is positioned in sensory receiving environment 203. Sensory receiving environment 203 is for example a physical building, enclosed environment, or open environment. Voice recognition unit 249 is positioned in sensory receiving environment 203 and communicates with DPS 200. Voice recognition unit 249 is controlled by a utility (VSR utility 140) and provides a voice recognition response application.

In one embodiment, a voice recognition unit communicates with a local (e.g. DPS 200) and/or remote device (e.g. server 265) via the Internet. Voice recognition unit 249 receives information from and delivers information to database 227 and GUI 239 via server 265. Database 227 stores preselected and/or pre-identified keywords and spectrograms associated with the pre-identified keywords. DPS 200 and/or server 265 store database 227. GUI 239 displays information, such as audience dynamics (e.g. audience population, including but not limited to gender information) and audience feedback (e.g. audience response to goods, service, and environment). GUI 239 is automatically updated via DPS 200 and/or server 265 when customer feedback is received. Database 227 is associated with an application programming interface to provide access and manipulation of GUI 239.

In another embodiment, a predefined subject matter for the customer feedback is received by the VSR utility. The speech recognition application enables voice recognition unit 249 to detect one or more audience response statements in the form of audio input within a sensory receiving environment 203. VSR utility (140 of FIG. 1) searches the received audio input for one or more words that match the previously stored (pre-identified) keywords in database 227. When a match of the one or more pre-identified keywords and received keywords is determined, a further analysis is performed utilizing an acoustic, lexical, and language model to determine the intent of the audience response statements.

In one embodiment, a score is applied to a response statement received within sensory receiving environment 203. One or more "scores" are assigned to each pre-identified keywords stored within database 227, whereby the score is a "negative", "positive", "neutral", or numbered score. The VSR utility determines an association between the spoken words and the keywords within database 227 and assigns a score to the customer response statement. The score of the response statement, received from the customer, depicts a positive, negative, or neutral evaluation of the subject matter associated with the sensory receiving environment 203.

In one embodiment, one or more unique human voices in an audience are identified during a program (e.g. a broadcast of a program, a live performance, exhibition of a video, exhibition of a video game, and/or output of audio) within a sensory receiving environment (203). DPS 200 determines when the one or more sounds are a human sound. DPS 200 receives and analyzes any verbal noise that is identifiable via measureable characteristics to identify an individual (e.g. laughing, humming, singing, whispering, booing, cheering, etc).

In another embodiment, a total count of audience members within the sensory receiving environment (203) is detected via one or more voice recognition units. Voice recognition system 249 identifies one or more unique human voices during the program (e.g. a broadcast of a program, a live performance, exhibition of a video, exhibition of a video game, and/or output of audio). Audience member 2 211, audience member 3 221, and audience member 4 231 are detected by a voice recognition system 249 and/or DPS 200 (whereby voice recognition system 249 is associated with DPS 200) when the individual members make a verbal statement. The characteristics of each human voice are analyzed at DPS 200. According to the unique characteristics of each of the detected voices, the VSR utility determines a count of unique human voices. The total count of audience members is calculated for all sensory receiving environments associated with the program, and the total count is utilized as an indication of the number of audience members sensing (i.e. listening to and/or watching) the program.

In one embodiment, no voice is detected within the sensory receiving environment (203), for example when a transmission of a broadcast program is received. Audience member 1 201 is watching television 202 without aural expression, as depicted by view 260. The total audience count is incremented by one when a transmission for the broadcast program is detected by DPS 200, for a predefined amount of time and no voice is detected. The detection of a change in the broadcast signal identifies that at least one audience member is within sensory receiving environment 203, even when no audio response is detected. When a new and/or additional voice is received, such as audience member 2 211, the current (and total) audience count is incremented by one after two unique voices are detected within sensory receiving environment 203. When transmission of a new program is detected, for a predefined amount of time, the audience member count is dynamically reset, and DPS 200 initiates a new count of the audience members for the new program.

In another embodiment, the total count of audience members detected within the sensory receiving environment is calculated. The total audience count is transmitted to an audience count database, database 227. Database 227 stores the current and past counts of audience members with respect to the associated program. Database 227 is associated with audience analysis GUI 239. When a unique human voice is detected, the count stored at database 227 is automatically modified to reflect the additional audience member(s). Audience analysis GUI 239 is dynamically updated when the audience count database is modified.

In one embodiment, a voice recognition unit is automatically initialized when one or more spoken words are detected. One or more voice recognition unit(s) 249 are associated with one or more audience member(s) (e.g. audience member 1 201, audience member 2 211, audience member 3 221, and audience member 4 231). The one or more voice recognition unit(s) 249 dynamically receive an audience response statement from the one or more audience members. The statement comprises one or more keywords within the spoken words of the audience response statement. The spoken words are automatically detected by voice recognition unit 249 and compared to pre-identified keywords within a database. When a determination finds the spoken words of the audience response statement match and/or is related to pre-identified keywords, a score is assigned to the response statement. The score and summary of the audience response statement(s) is provided in GUI 239, similar to (GUI 339 of FIG. 3).

During implementation of the various embodiments, so as to respect the privacy rights of the audience within the sensory receiving environment, when voice recognition 249 is engaged one or more privacy statements are displayed (and/or otherwise outputted within the environment). The privacy statement informs each individual that one or more statements output (i.e. spoken, expressed via song, laughter, etc) within sensory receiving environment 203 are being monitored. The privacy statement further notifies an individual entering sensory receiving environment 203 that although the statements are monitored, the statements are not recorded. The monitored statements are analyzed by a computer system which outputs information associated with sensory receiving environment 203. The information obtained within sensory receiving environment 203 is unassociated with the individual(s) providing the output.

FIG. 3 depicts an audience response graphical user interface (GUI). Audience response GUI 339 is generated and/or provided by a server (e.g. server 256, FIG. 2). Audience response GUI 339 displays phrase 324, predetermined analysis formulas, or actions 325, and score 326.

In one embodiment, the audience response statement comprises one or more pre-identified keywords within the spoken words of the statement. The spoken words are automatically detected by a speech recognition unit and compared to pre-selected keywords within a database. When a determination finds the spoken words of the phrase 324 (consumer response statement) match and/or is related to preselected keywords, the response statement is analyzed via the CFS utility (140 of FIG. 1). An audience response analysis depicts a positive, negative, or neutral evaluation from one or more audiences is provided (actions 325), whereby the audience response analysis is represented as a score (as depicted in "score" column of audience response GUI 339).

In another embodiment, an audience response GUI 339 is dynamically updated. One or more predetermined analysis formulas determine the score of the audience response statement as related to the predefined subject matter. The predetermined analysis formula is associated with the audience response statement, whereby words which relate to the predefined subject matter are scored. One or more words within a database (database 221 of FIG. 2) are assigned a score (score 326). The phrases (phrase 324) are displayed in audience response GUI 339. When one or more spoken words are equivalent in meaning to one or more words in the database, the keyword score of the word in the database is assigned to the spoken word, according to the position of the words in the sentence. A positive, negative, and/or a neutral (action 325) is applied to the word in the database (as associated with the statement of phrase 324), resulting in a score (e.g. score 326).

The positive, negative, or neutral score is applied to the word according to the association of the word with one or more other words in the statement. For example, the term "terrified" in the statement "Wow, that was a super cool movie, I was terrified!" would receive a positive score; however, the term "terrified" in the statement "What a horrible movie, my children were terrified!" would receive a negative score.

In one embodiment, the score of the statement is calculated according to a predetermined analysis formula, or actions 325. Actions 325 is any formula utilized to calculate the score of the audience response statement. The predetermined analysis formula may be one of: a positive feedback formula and a negative feedback formula. When the spoken words are associated with negative feedback, the score of the audience statement is adjusted negatively, and when the spoken words are associated with positive feedback, the score of the audience statement is adjusted positively, as depicted in audience response GUI 339. One or more of a pure score and an average score is calculated when one or more audience response statements are received.

Figure 4:
FIG. 4 illustrates an example graphical user interface generated when one or more customer response statements are received, in accordance with one embodiment of the invention.

An audience information GUI is depicted in FIG. 4. Audience information GUI 405 includes location and date 406, and current feedback results 412. Feedback button 420 and speaker (or microphone) 422 are hardware devices associated with audience information GUI 405. In one embodiment audience feedback GUI 405 is generated by a VSR utility (140, of FIG. 1). Audience information GUI 405 is automatically updated when new audience response results analysis are received by the VSR utility.

In one embodiment, the audience information GUI 405 is displayed by a data processing system. As new audience statements are received, current feedback results 412 are dynamically updated. Audience members (e.g. audience member 1 301, audience member 2 311, audience member 3 321, and audience member 4 331) engage feedback button 420 and speak into speaker 422. The spoken words of the one or more audience members are automatically analyzed and the score within current feedback results 412 are dynamically updated. Programming of the voice recognition unit may be specific to a person, location, event, language and/or any experience that provides feedback to improve and/or modify a service, event, program, etc.

In another embodiment, audience feedback is received for one or more subjects (e.g. movie, park, and store) listed in current feedback results 412. An application programming interface associated with audience feedback GUI 405 allows the utility (VSR utility 140, FIG. 1) to enable selection of one or more subjects. The subject associated with the audience feedback is selected before and/or after the audience feedback (e.g. audio input is received) by speaker 422. The current number of responses, displayed within current feedback results 412, depicts the number of responses received by the voice recognition unit (249 of FIG. 2) for the associated subject.

In one embodiment, VSR utility 140 receives a signal via speaker 422 (associated with voice recognition unit 249 within sensory receiving environment 203). VSR utility 140 receives the audio response as an acoustic signal. When an audio response is received, VSR utility 140 dynamically generates a subsequent GUI that outputs a message to determine whether the score of the audio response received expresses the intent of the audio response. The audience member that outputted the audio response may be given an option to accept or reject the score. When the score expresses the intent of the audio response the GUI returns to the original display and dynamically receives additional audio responses. When the score of the statement does not express the intent of the audio response, the audience member is given an option to repeat the statement until the statement expresses the intent of the audience member.

Figure 5:
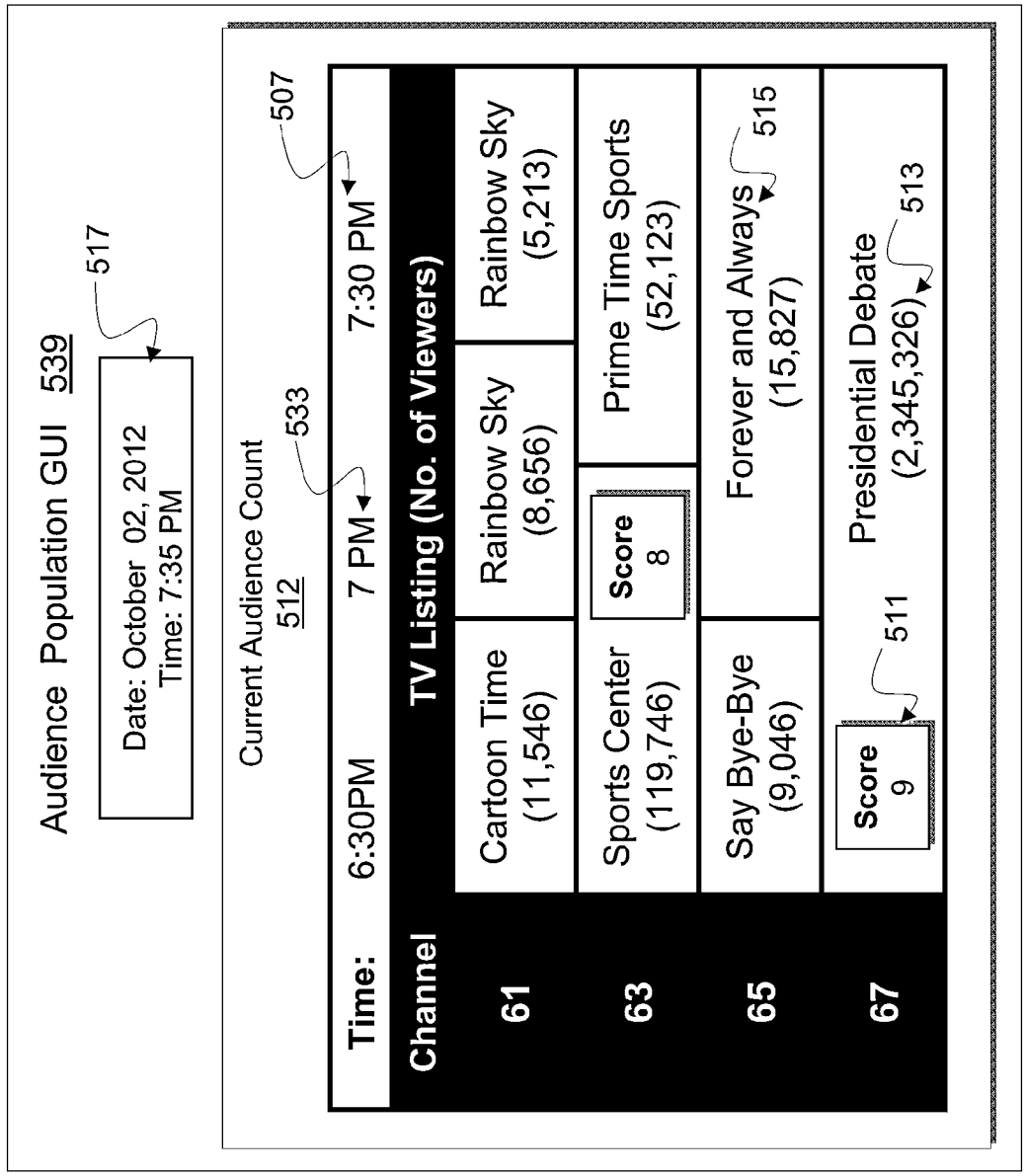
FIG. 5 illustrates an example audience population graphical user interface displaying the audience population associated with one or more programs, according to one embodiment of the invention.

In another embodiment, an audience analysis graphical user interface is generated, wherein the total count of audience members is displayed. Audience population GUI is depicted in FIG. 5. Audience analysis GUI 539 comprises current audience count display 512 which includes: past listing time 533, current listing time 507, score 511, TV (or event) listing title 515, date and time stamp 517, and total count of audience members 513.

The count of unique human voices is transmitted to the server 265 (of FIG. 2). Server 265 generates audience analysis GUI 539 utilizing information from audience count database (227) and/or directly retrieved from DPS 200. When one or more unique human voices are detected during transmission of the broadcast program, audience analysis GUI 539 is dynamically updated with the total number of current audience members. As the date, time, broadcast program (or event) listing, and total audience count are updated, the following features of audience analysis GUI 539 are dynamically updated: date and time stamp 517, total count of audience members 513, current listing time 507, score 511, and TV listing title 515. Score 511 is an average score generated when one or more audio responses are received by one or more voice recognition units (249 of FIG. 2).

In one embodiment, broadcast program listings and audience counts are displayed on the audience analysis GUI. The current audience count is associated with current broadcast program (or event) listings displayed within current listing time 507. Past audience counts are associated with past broadcast program (or event) listings, displayed under past listing time 533. Past broadcast program (or event) listings are displayed with past audience counts for one or more broadcast program listings. Current broadcast program listings and current audience counts are displayed for one or more broadcast program listings.

Figure 6:
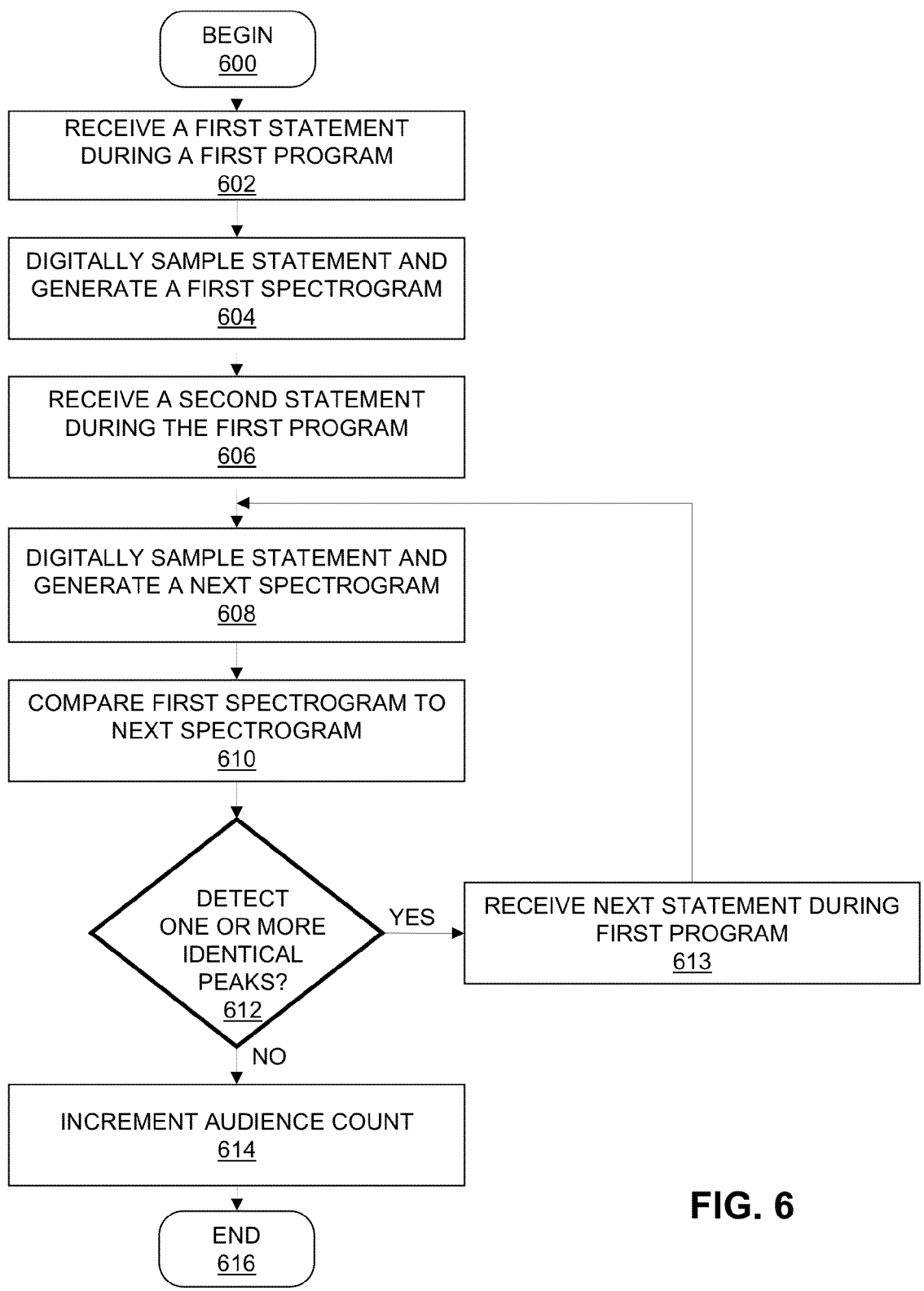
FIG. 6 is a flow chart illustrating the process for analyzing one or more audience response statements, in accordance with one embodiment of the invention.
Figure 7:
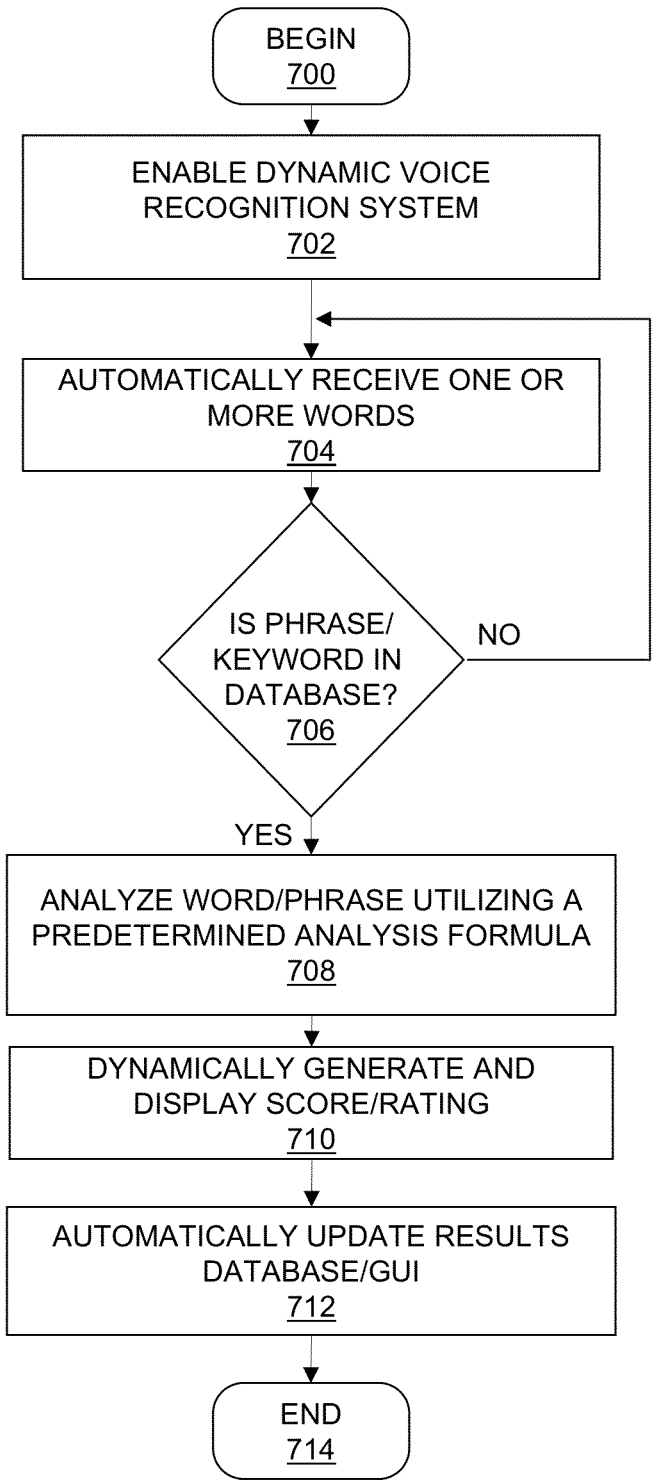
FIG. 7 is a flow chart illustrating the process for receiving customer response statements, according to one embodiment of the invention.
Figure 8:
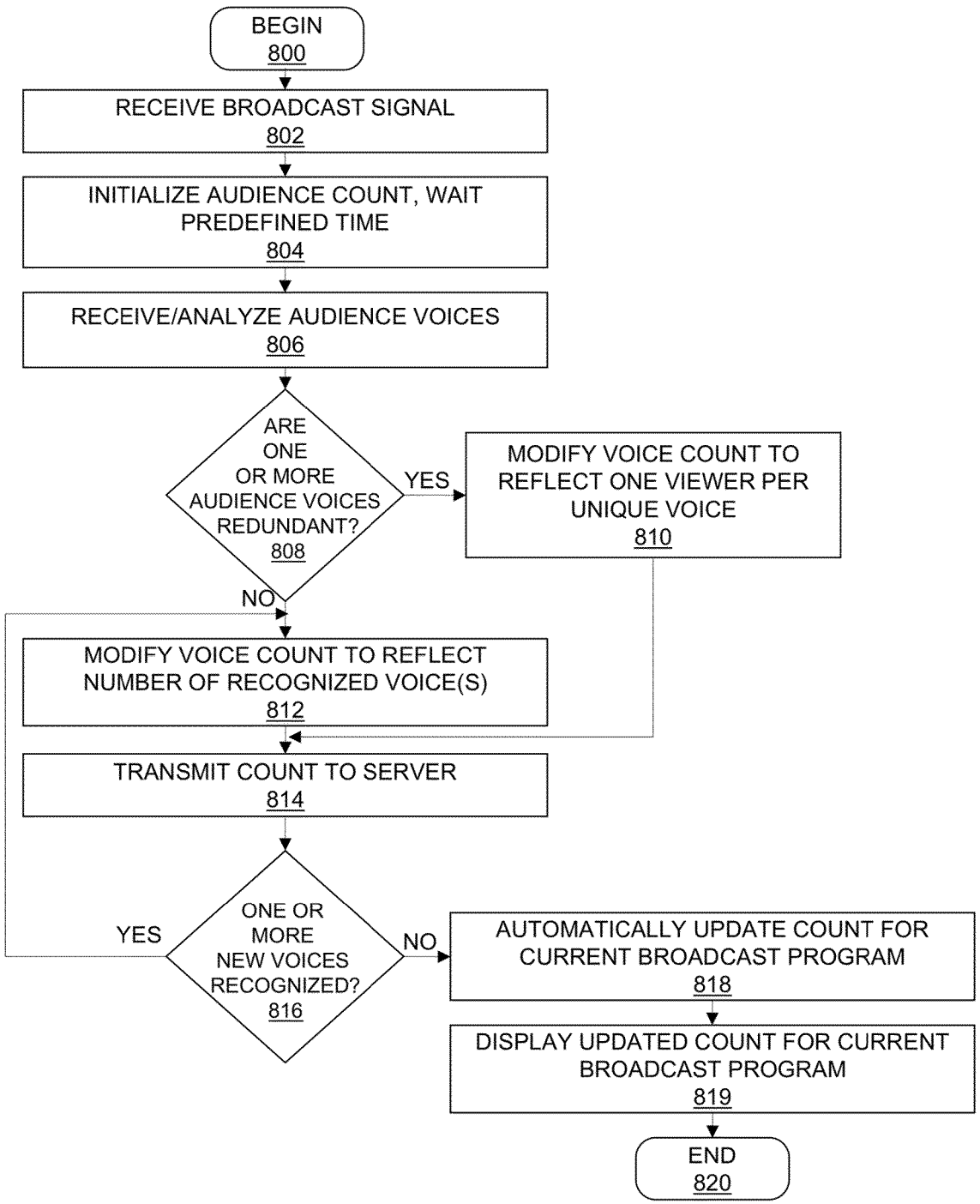
FIG. 8 is a flow chart illustrating the process for analyzing the audience population, according to one embodiment of the invention.

FIGS. 6-8 are flow charts illustrating various methods by which the above processes of the illustrative embodiments are completed. Although the methods illustrated in FIGS. 6-8 may be described with reference to components shown in FIGS. 1-5, it should be understood that this is merely for convenience and alternative components and/or configurations thereof can be employed when implementing the various methods. Key portions of the methods may be completed by VSR utility 140 executing on processor 105 within DPS 100 (FIG. 1) and controlling specific operations of DPS 100, and the methods are thus described from the perspective of both VSR utility 145 and DPS 100.

FIG. 6 illustrates the process for analyzing one or more customer feedback statements (laughs, boos, etc). The process of FIG. 6 begins at initiator block 600 and proceeds to block 602, at which a first statement is received during a first program. At block 604 the first statement is digitally sampled, and a first spectrogram is generated. A second statement is received during the first program at block 606. The second (or next) statement is digitally sampled, block 608, and a second (or next) spectrogram is generated. At block 610 the second (or next) spectrogram is compared to the first spectrogram. A decision is made, at block 612, whether one or more identical peaks are detected between the first spectrogram and the second spectrogram. If one or more identical peaks are identified (i.e. the first statement and the second (or next) statement is from the same audience member), at block 612, a next (e.g. third, fourth, etc) statement is received at block 613. If one or more peaks are not identified as identical (i.e. the first statement and second statement are from different audience members), at block 612, the audience count is incremented at block 614. The process ends at block 616.

The process for receiving customer feedback statements (response) is depicted in FIG. 7. The process begins at block 700, and continues to block 702 where the dynamic speech recognition system is enabled. At block 704 a customer feedback statement is automatically received by the speech recognition system. A decision is made at block 706, whether the spoken words (or comparable words) of the customer feedback statement are detected within the database. If the words are not identified in the database, the process continues to block 704. If the words are in the database the process continues to block 708 where the customer feedback statement is analyzed to generate a score or rating utilizing the predetermined analysis formula. At block 710 the score and/or rating of the customer feedback statement is dynamically generated and displayed. The customer feedback analysis database and/or GUI are automatically updated at block 712. The process ends at block 714.

FIG. 8 illustrates the process for analyzing audience voices in a sensory receiving environment. The process of FIG. 8 begins at initiator block 800 and proceeds to block 802, at which a broadcast programming signal is received. At block 804 the audience count for the current broadcast program is initialized. Prior to detecting voices in the sensory receiving environment, the VSR utility waits a predefined amount of time (to insure audience member is not just turning through channels, for example). One or more audience voices are received and analyzed at block 806.

At block 808 a decision is made whether one or more of the voices are redundant. If one or more audience voices are redundant, the process continues to block 810. At block 810 the voice count is modified to reflect one viewer per unique voice. The process continues to block 814. If the audience voices are not redundant, the process continues to block 812. At block 812 the audience voice count is modified to reflect the count of unique voices within the recognized voices. The audience voice count is transmitted to the server at block 814. A decision is made at block 816, whether one or more new (additional) voices are recognized. If additional audience voices are recognized, the process continues to block 812. If additional audience voices are not recognized, the process continues to block 818. At block 818 the count for the current broadcast program is automatically updated. The updated count for the current broadcast program is displayed at block 819. The process ends at block 820.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, and DVDs.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing device having a processor and a voice capture and recognition unit coupled to the processor, a processor-implemented method for enabling dynamic receipt and analysis of captured audio responses utilizing a voice recognition unit, said method comprising:
the processor dynamically detecting an audio input that includes speech and speech related sounds from an audience comprising a plurality of audience members;
the processor identifying received keywords within the detected audio input;
the processor generating a spectrogram for each received keyword, wherein each of the spectrograms indicate unique voice characteristics of one of the audience members providing each of the received keywords;
in response to identifying the received keywords, the processor comparing the received keywords to one or more pre-identified keywords in a pre-established database, wherein the pre-established database indicates a relative score for each of the one or more pre-identified keywords;
in response to a determination that the received keywords match one or more of the pre-identified keywords within the pre-established database, the processor generating a score based on the relative score for each of the pre-identified keywords that match the received keywords;
the processor determining that two or more of the received keywords are from a same audience member of the plurality of audience members by comparing the spectrograms created for at least two of the received keywords; and
the processor modifying the score to account for the two or more of the received keywords from the same audience member,
wherein the modified score represents an audience evaluation, wherein each audience member of the plurality of audience members contributes to the modified score.

2. The method of claim 1, further comprising:
in response to identifying the received keywords, the processor dynamically associating the received keywords of the audio input with a subject, wherein the subject is determined from among one or more subjects linked to the pre-identified keywords that match the received keywords.

3. The method of claim 2, further comprising:
the processor assigning the score to the subject;
the processor assigning one of a positive, a negative, and a neutral relative score according to an association of each of the received keywords with one or more other words detected within the captured audio responses;
the processor displaying the subject with the score assigned to the subject within a graphical user interface; and
in response to a determination that the received keywords are associated with a pre-identified keyword of the one or more pre-identified keywords that represents a negative feedback, the processor modifying the score assigned to the subject by applying, to the score, the relative score for the pre-identified keyword utilizing a predetermined analysis formula.

4. The method of claim 3, further comprising:
the processor dynamically updating the score assigned to the subject when additional speech or speech related sounds are received with one or more subsequent received keywords that match one or more of the pre-identified keywords; and
the processor displaying the updated score within the graphical user interface.

5. The method of claim 2, further comprising:
the processor displaying the one or more subjects within a graphical user interface;
the processor enabling selection of one or more of the one or more subjects associated with one or more pre-identified keywords from within the graphical user interface;
the processor storing the one or more subjects within the pre-established database;
the processor retrieving the one or more subjects from the pre-established database in response to the received keywords matching one or more of the pre-identified keywords to which the one or more subjects is linked; and
the processor displaying the one or more subjects retrieved from the pre-established database as one or more subjects to which the audio input is associated.

6. The method of claim 1, further comprising:
the processor receiving, at an audio detection unit, inputs of the captured audio responses and one or more of a broadcast signal and a program signal;
the processor receiving a separate input at the voice recognition unit, the separate input comprising the one or more of the broadcast signal and program signal;
the processor inverting the separate input;
the processor adding the inverted separate input to the inputs received at the audio detection unit to generate a filtered output with the captured audio responses;
the processor identifying one or more keywords within the filtered output, wherein the one or more keywords within the filtered output are received keywords from the filtered output;
the processor comparing the received keywords from the filtered output to one or more of the pre-identified keywords in the pre-established database; and
in response to a determination that the received keywords from the filtered output match one or more of the pre-identified keywords within the pre-established database, the processor generating a score for the received keywords from the filtered output, based on a relative keyword score associated with the one or more of the pre-identified keywords that match the received keywords from the filtered output, wherein the relative keyword score represents one or more of a positive evaluation, a negative evaluation, and a neutral evaluation of speech and speech related sounds.

7. The method of claim 1, further comprising:
the processor receiving a selection of one of the one or more pre-identified keywords via a graphical user interface;
the processor storing the one of the one or more pre-identified keywords in the pre-established database;
the processor storing the pre-established database at one or more of a local server and a remote server; and
the processor associating the one of the one or more pre-identified keywords within the pre-established database with a relative score comprising one of a positive keyword score, a negative keyword score, and a neutral keyword score.

8. A computer program product comprising:
a tangible computer readable storage device;

program code, stored on the storage device, to dynamically detect an audio input that includes speech and speech related sounds from an audience comprising a plurality of audience members;

program code, stored on the storage device, to identify received keywords within the detected audio input;

program code, stored on the storage device, to generate a spectrogram for each received keyword, wherein each of the spectrograms indicate unique voice characteristics of one of the audience members providing each of the received keywords;

program code, stored on the storage device, to, in response to identifying the one or more received keywords, compare the received keywords to one or more pre-identified keywords in a pre-established database, wherein the pre-established database indicates a relative score for each of the one or more pre-identified keywords;

program code, stored on the storage device, to, in response to a determination that the received keywords match one or more of the pre-identified keywords within the pre-established database, generate a score based on the relative score for each of the pre-identified keywords that match the received keywords;

program code, stored on the storage device, to determine that two or more of the received keywords are from a same audience member of the plurality of audience members by comparing the spectrograms created for at least two of the received keywords; and program code, stored on the storage device, to modify the score to account for the two or more of the received keywords from the same audience member of the plurality of audience members, wherein the modified score represents an audience evaluation, wherein each audience member of the plurality of audience members contributes to the modified score.

9. The computer program product of claim 8, further comprising:

program code, stored on the storage device, to, in response to identifying the received keywords, dynamically associate the received keywords of the audio input with a subject, wherein the subject is determined from among one or more subjects linked to the pre-identified keywords that match the received keywords.

10. The computer program product of claim 9, further comprising:

program code, stored on the storage device, to assign the score to the subject;

program code, stored on the storage device, to assign a positive, a negative, or a neutral relative score according to an association of each of the received keywords with one or more other words detected within one or more captured audio responses;

program code, stored on the storage device, to associate a calculated score with the subject when the detected audio input is associated with the subject;

program code, stored on the storage device, to display the subject with the score assigned to the subject within a graphical user interface;

program code, stored on the storage device, to, in response to a determination that the received keywords are associated with a pre-identified keyword of the one or more pre-identified keywords that represents a negative feedback, modify the score assigned to the subject by applying, to the score, the relative score for the pre-identified keyword that represents the negative feedback utilizing a predetermined analysis formula;

program code, stored on the storage device, to, in response to a determination that the received keywords are associated with a pre-identified keyword of the one or more pre-identified keywords that represents a positive feedback, increase the score assigned to the subject by applying, to the score, the relative score associated with the pre-identified keyword that represents the positive feedback utilizing the predetermined analysis formula;

program code, stored on the storage device, to dynamically update the score of the subject when additional speech or speech related sounds are received with one or more subsequent received keywords that match one or more of the pre-identified keywords; and program code, stored on the storage device, to display the updated score of the subject within the graphical user interface.

11. The computer program product of claim 8, further comprising:

program code, stored on the storage device, to receive a selection of one of the one or more pre-identified keywords via a graphical user interface;

program code, stored on the storage device, to store the one of the one or more pre-identified keywords in the pre-established database;

program code, stored on the storage device, to store the pre-established database at one or more of a local server and a remote server;

program code, stored on the storage device, to associate the one of the one or more pre-identified keywords within the pre-established database with a relative score that is one of a positive score, a negative score, and a neutral keyword score;

program code, stored on the storage device, to enable access to the pre-established database;

program code, stored on the storage device, to compare the received keywords identified within the detected audio input to the one of the one or more pre-identified keywords in the pre-established database; and program code, stored on the storage device, to retrieve the relative score for the one of the one or more pre-identified keywords.

12. The computer program product of claim 8, further comprising:

program code, stored on the storage device, to receive, at an audio detection unit, inputs of one or more captured audio responses and one or more of a broadcast signal and a program signal;

program code, stored on the storage device, to receive a separate input at the voice recognition unit, the separate input comprising the one or more of the broadcast signal and program signal;

program code, stored on the storage device, to invert the separate input;

program code, stored on the storage device, to add the inverted separate input to the inputs received at the audio detection unit to generate a filtered output with the one or more captured audio responses;

program code, stored on the storage device, to identify one or more keywords within the filtered output, wherein the one or more keywords within the filtered output are received keywords from the filtered output;

program code, stored on the storage device, to compare the received keywords from the filtered output to one or more of the pre-identified keywords in the pre-established database; and program code, stored on the storage device, to, in response to a determination that the received keywords from the filtered output match one or more of the pre-identified keywords within the pre-established database, generate a score for the received keywords from the filtered output, based on a relative keyword score associated with the pre-identified keywords that match the received keywords from the filtered output, wherein the relative keyword score represents one or more of a positive evaluation, a negative evaluation, and a neutral evaluation of speech and speech related sounds.

13. The computer program product of claim 9, further comprising:
    program code, stored on the storage device, to display the one or more subjects within a graphical user interface;
    program code, stored on the storage device, to enable selection of the one or more subjects associated with one or more pre-identified keywords from within the graphical user interface;
    program code, stored on the storage device, to store the one or more subjects within the pre-established database;
    program code, stored on the storage device, to retrieve the one or more subjects from the pre-established database in response to the received keywords matching the one or more of the pre-identified keywords to which the one or more subjects is linked; and
    program code, stored on the storage device, to display the one or more subjects retrieved from the pre-established database as one or more subjects to which the audio input is associated.

14. A data processing system comprising:
    a bus;
    a processor coupled to the bus; and
    a computer readable tangible storage device coupled to the bus, the computer readable tangible storage device containing instructions that, when carried out by the processor, implement a method comprising:
        the processor dynamically detecting an audio input that includes speech and speech related sounds from an audience comprising a plurality of audience members;
        the processor identifying received keywords within the detected audio input;
        the processor generating a spectrogram for each received keyword, wherein each of the spectrograms indicate unique voice characteristics of one of the audience members providing each of the received keywords;
        in response to identifying the received keywords, comparing the received keywords to one or more pre-identified keywords in a pre-established database, wherein the pre-established database indicates a relative score for each of the one or more pre-identified keywords;
        in response to a determination that the received keywords match one or more of the pre-identified keywords within the pre-established database, the processor generating a score based on the relative score for each of the pre-identified keywords that match the received keywords;
        the processor determining that two or more of the received keywords are from a same audience member of the plurality of audience members by comparing the spectrograms created for at least two of the received keywords; and
        the processor modifying the score to account for the two or more of the received keywords from the same audience member of the plurality of audience members, wherein the modified score represents an audience evaluation, wherein each audience member of the plurality of audience members contributes to the modified score.

15. The data processing system of claim 14, wherein the method further comprises:
    in response to identifying the received keywords, the processor dynamically associating the received keywords of the audio input with a subject, wherein the subject is determined from among one or more subjects linked to the pre-identified keywords that match the received keywords.

16. The data processing system of claim 15, wherein the method further comprises:
    the processor assigning the score to the subject;
    the processor assigning a positive, a negative, or a neutral relative score according to the association of each of the received keywords with one or more other words detected within one or more captured audio responses;
    the processor displaying the subject with the score assigned to the subject within a graphical user interface;
    in response to a determination that the received keywords are associated with a pre-identified keyword of the one or more pre-identified keywords that represents a negative feedback, the processor modifying the score assigned to the subject by applying, to the score, the relative score for the pre-identified keyword that represents the negative feedback utilizing a predetermined analysis formula;
    the processor dynamically updating the score of the subject when additional speech or speech related sounds are received with one or more subsequent received keywords that match one or more of the pre-identified keywords; and
    the processor displaying the updated score of the subject within the graphical user interface.

17. The data processing system of claim 14, wherein the method further comprises:
    the processor receiving a selection of one of the one or more pre-identified keywords via a graphical user interface;
    the processor storing the one of the one or more pre-identified keywords in the pre-established database;
    the processor storing the pre-established database at one or more of a local server and a remote server;
    the processor associating the one of the one or more pre-identified keywords within the pre-established database with one of a positive keyword score, a negative keyword score, and a neutral keyword score;
    the processor enabling access to the pre-established database;
    the processor comparing the received keywords identified within the detected audio input to the one or more pre-identified keywords in the pre-established database; and
    the processor retrieving the relative score for the one of the one or more pre-identified keywords.

18. The data processing system of claim 14, wherein the method further comprises:
    the processor receiving, at the audio detection unit, inputs of one or more captured audio responses and one or more of a broadcast signal and a program signal;
    the processor receiving a separate input at the voice recognition unit, the separate input comprising the one or more of the broadcast signal and program signal;
    the processor inverting the separate input;

the processor adding the inverted separate input to the input received at the audio detection unit to generate a filtered output with the one or more captured audio responses;

the processor identifying one or more keywords within the filtered output, wherein the one or more keywords within the filtered output are received keywords from the filtered output;

the processor comparing the received keywords from the filtered output to one or more of the pre-identified keywords in the pre-established database; and in response to a determination that the one or more received keywords from the filtered output match one or more of the pre-identified keywords within the pre-established database, the processor generating a score for the received keywords from the filtered output, based on a relative keyword score associated with the one or more of the pre-identified keywords that match the received keywords from the filtered output, wherein the relative keyword score represents one or more of a positive evaluation, a negative evaluation, and a neutral evaluation of speech and speech related sounds.

19. The data processing system of claim 15, wherein the method further comprises:

the processor displaying the one or more subjects within the graphical user interface;

the processor enabling selection of one or more of the one or more subjects associated with one or more pre-identified keywords from within the graphical user interface;

the processor storing the one or more subjects within the pre-established database;

the processor retrieving the one or more subjects from the pre-established database in response to the received keywords matching one or more of the pre-identified keywords to which the one or more subjects is linked; and the processor displaying the one or more subjects retrieved from the pre-established database as one or more subjects to which the audio input is associated.

20. The method of claim 2, further comprising:

the processor assigning the score to the subject;

the processor assigning one of a positive, a negative, and a neutral relative score according to an association of each of the received keywords with one or more other words detected within the captured audio responses;

the processor displaying the subject with the score assigned to the subject within a graphical user interface; and in response to a determination that the received keywords are associated with a pre-identified keyword of the one or more pre-identified keywords that represents a positive feedback, the processor increasing the score of the subject by applying, to the score, the relative score for the pre-identified keyword utilizing a predetermined analysis formula.

21. The method of claim 7, further comprising:

the processor enabling access to the pre-established database;

the processor comparing the received keywords identified within the detected audio input to the one of the one or more pre-identified keywords in the pre-established database; and the processor retrieving the relative score for the one of the one or more pre-identified keywords.

\* \* \* \* \*